219-121 SR
4/12/77 OR 4,017,708

United States Patent [19]
Engel et al.

[11] 4,017,708
[45] Apr. 12, 1977

[54] METHOD AND APPARATUS FOR HEAT TREATING AN INTERNAL BORE IN A WORKPIECE

[75] Inventors: Simon L. Engel, Mountain View, Calif.; Preston L. Gale, East Peoria; Glenn H. Lenzen, Jr., Peoria, both of Ill.

[73] Assignee: Caterpillar Tractor Co., Peoria, Ill.

[22] Filed: Feb. 27, 1976

[21] Appl. No.: 662,078

Related U.S. Application Data

[63] Continuation of Ser. No. 487,913, July 12, 1974, abandoned.

[52] U.S. Cl. .................................. 219/121 LM
[51] Int. Cl.² .................................. B23K 26/00
[58] Field of Search .............. 219/121 L, 121 LM; 148/1

[56] References Cited

UNITED STATES PATENTS

| | | | |
|---|---|---|---|
| 2,556,236 | 6/1951 | Strickland, Jr. | 148/150 |
| 2,604,419 | 7/1952 | Herbenar | 148/150 |
| 3,154,370 | 10/1964 | Johnson | 219/121 L X |
| 3,772,496 | 11/1973 | Harendza-Harinxma | 219/121 LM |
| 3,773,565 | 11/1973 | Pye et al. | 148/1 |
| 3,802,927 | 4/1974 | Gomada | 219/121 L X |
| 3,848,104 | 11/1974 | Locke | 219/121 L |

OTHER PUBLICATIONS

IBM Technical Disclosure vol. 14, No. 9, 2/1972, "Optical System for Laser Machining of Narrow Slots."

*Primary Examiner*—J. V. Truhe
*Assistant Examiner*—Mark Paschall
*Attorney, Agent, or Firm*—Charles E. Lanchantin, Jr.

[57] ABSTRACT

A method of heat treating a bore in a workpiece to increase its surface hardness is disclosed, including shaping an annular laser beam emanating from a source into an elongated focal pattern to provide a more evenly distributed energy level in cross section, directing the elongated focal pattern generally axially inwardly toward the bore, reflecting the elongated focal pattern from a mirror arrangement substantially transversely upon a surface of the bore to provide an instantaneously more uniformly hot heating zone thereat, and effecting relative motion between the workpiece and the mirror arrangement so that the bore is progressively scannably heat treated to minimize heating of the entire workpiece.

7 Claims, 10 Drawing Figures

100X

RELATIVELY HARD MARTENSITIC SURFACE LAYER

RELATIVELY TOUGH PEARLITIC BODY PORTION

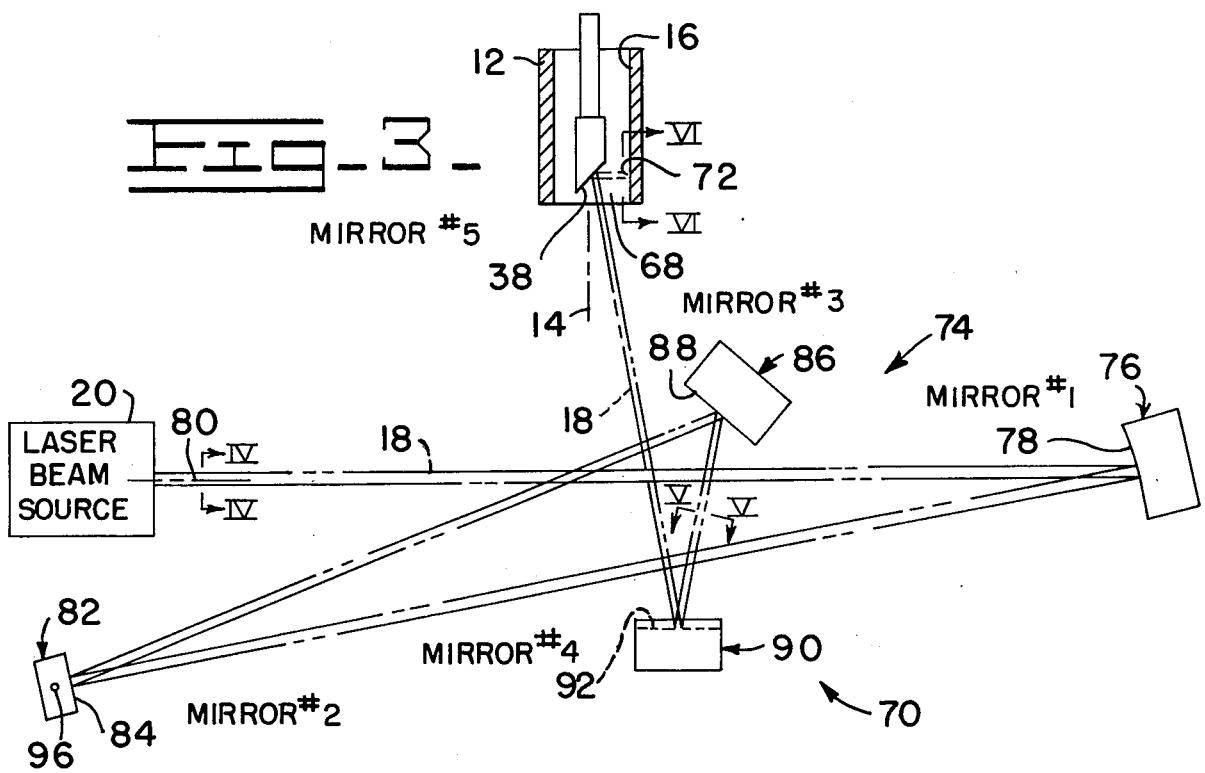
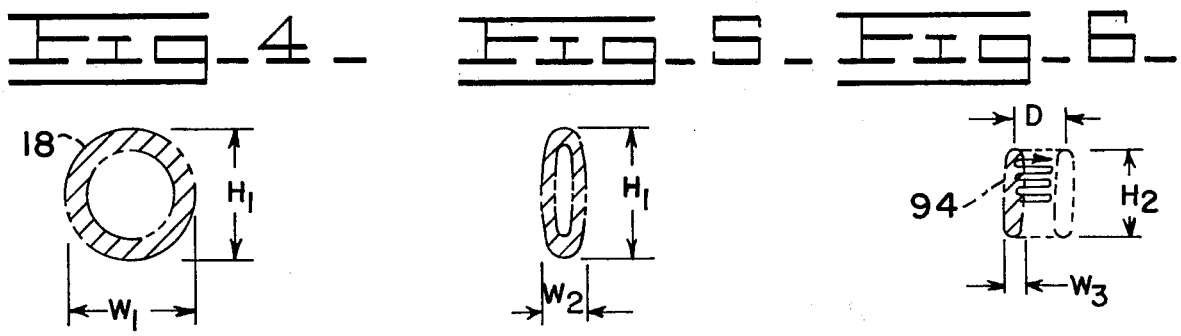
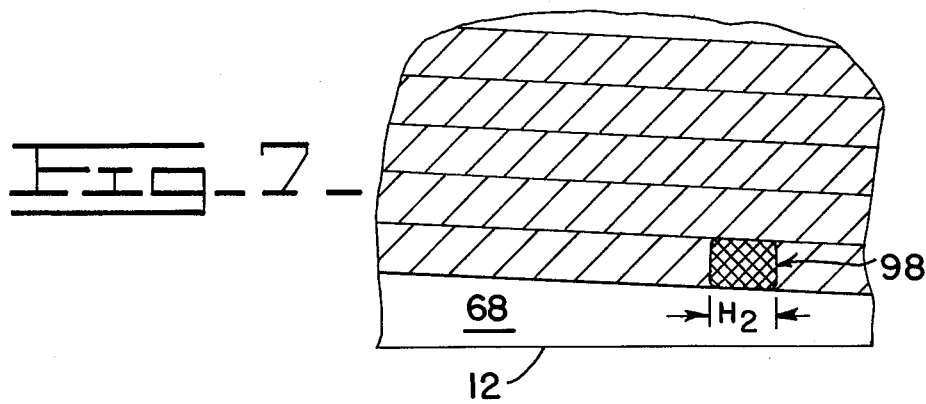

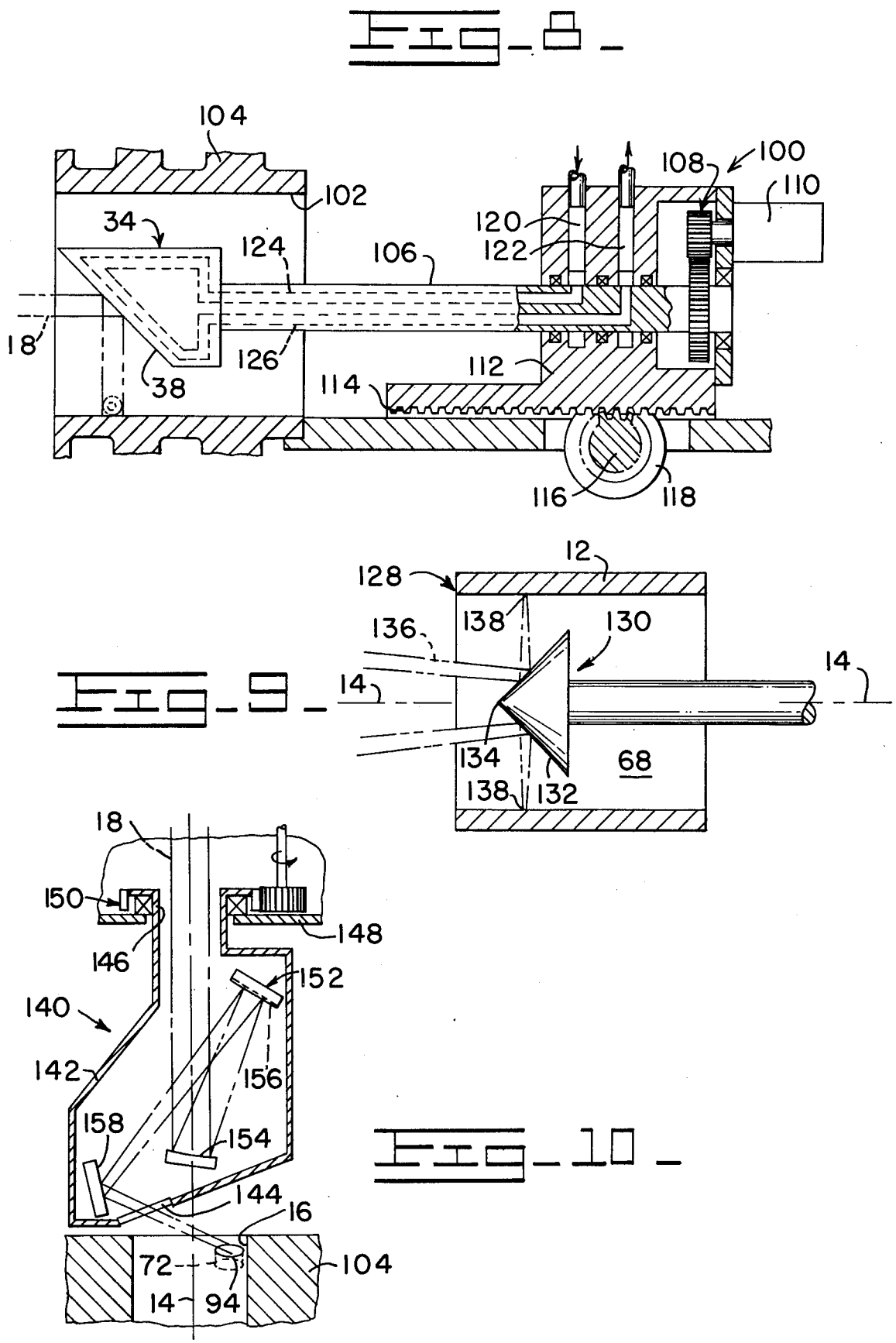

METHOD AND APPARATUS FOR HEAT TREATING AN INTERNAL BORE IN A WORKPIECE

This is a continuation of application Ser. No. 487,913, filed July 12, 1974, now abandoned.

BACKGROUND OF THE INVENTION

Internal combustion engine cylinder bores and cylinder liner bores are conventionally heat treated by electrical induction devices which travel longitudinally therethrough in order to surface harden that portion of the bore that experiences piston wear. The circumferential, red hot band resulting from the electrical heating field, is normally followed as it moves through the bore by an umbrella of cooling fluid that impinges on the band axially away from the heating field. While this technique is being used with relative success by the industry, it requires a relatively expensive manufacturing apparatus, and despite careful control of operational parameters, non-uniform depths of heat treatment and hardness are obtained. For example, one of the problems inherent with induction heating systems is that surface or subsurface irregularities tend to interrupt the electric field and thereby cause localized concentrations of heat. Such heat concentrations result in a variable microstructure of the bore, which leads to cracking problems in the workpiece. Further, high energy levels, for example, in the range of 150 to 400 kilowatts, tend to direct an excessive amount of heat into the workpiece thereby causing distortion thereof and often times an adverse affect on the metallurgical structure of nearby areas. Such latter problem is particularly acute on engine blocks with very closely spaced individual bores. In addition, induction heat treating is limited to elongated cylindrical areas and is relatively impractical for heat treating narrow or interrupted bands.

Reference is made to U.S. Pat. No. 3,772,496 to Harendza-Harinxma which discloses a relatively involved method and apparatus for removing a copper layer from the inner wall of a tube. Such patent teaches use of a concentrated beam of laser energy which is reflected from a mirror upon the inner wall to vaporize a helical path through the copper layer. While this patent is of some interest, it does not relate to heat treating a bore of a workpiece or solving the particular problems inherent therewith to which the present invention is particularly directed.

SUMMARY AND OBJECTS OF THE INVENTION

It is, therefore, an object of the present invention to provide an improved method of producing a heat treated, hardened wear surface on a relatively inaccessible area such as an internal bore in a workpiece.

Another object of the present invention is to provide such an improved method which is capable of uniformly heat treating a cylindrical bore in order to increase the surface hardness thereof.

Another object of the present invention is to provide a method of the character described which is effective progressively scannably to heat treat such a cylindrical bore in order to minimize heat transmission to the entire workpiece.

Other objects and advantages of the present invention will become more readily apparent upon reference to the accompanying drawings and the following description.

BRIEF DESCRIPTION OF THE DRAWINGS

FIG. 3 is a schematic top plan view of an alternate embodiment apparatus of the present invention, including a mirror system adaptable to progressively scannably heat treat an engine cylinder liner to an effectively greater depth.

FIG. 4 is a transverse section through a collimated laser beam taken along the line IV—IV of FIG. 3.

FIG. 5 is another transverse section of the laser beam taken along the line V—V of FIG. 3.

FIG. 6 is another transverse section of the laser beam taken along the line VI—VI of FIG. 3 schematically illustrating the parameters of the beam at the surface of the cylinder liner.

FIG. 7 is a fragmentary, developed portion of the surface of the cylinder liner of FIG. 3 showing schematically thereon the generally helical heat treat path of the laser beam which is provided by the improved method and apparatus of the present invention.

FIG. 8 is a fragmentary, central sectional view of an engine cylinder block and associated cylinder bore, and a second alternate embodiment apparatus for progressively scannably heat treating the bore in accordance with the improved method of the present invention.

FIG. 9 is a view of a third alternate embodiment apparatus of the present invention, showing a central section of a cylinder liner and a conical mirror for reflecting an annular ring-shaped laser beam radially outwardly upon the inside diameter of the liner.

FIG. 10 is a transverse central sectional view of a fourth alternate embodiment apparatus of the present invention in externally aligned relation with respect to a cylinder bore, and showing a mirror system disposed within an enclosed rotating housing.

DESCRIPTION OF BASIC EMBODIMENT

Figure 1:
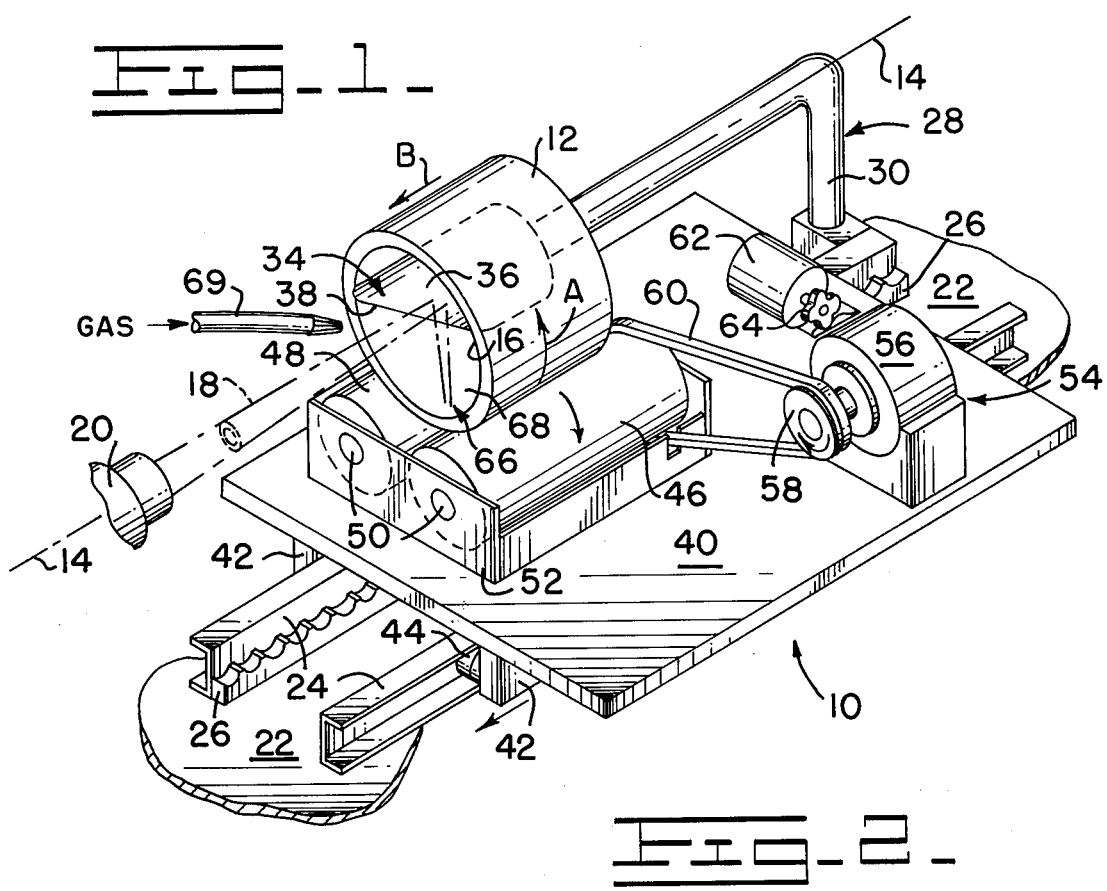
FIG. 1 is a perspective view of an apparatus for progressively scannably heat treating a cylindrical workpiece such as an engine cylinder liner or the like in accordance with the novel method of the present invention.

Referring to FIG. 1, the apparatus 10 of the present invention is efficiently able to heat treat a cylindrical workpiece 12 such as a gray iron cylinder liner for an internal combustion engine or the like. This apparatus simultaneously supports, rotates, and axially travels the cylinder liner 12 along a longitudinal axis 14. A relatively inaccessible internal cylindrical bore 16 within the liner is progressively scannably heat treated by a beam of electromagnetic energy 18 schematically illustrated in broken lines. The beam is preferably a laser beam, and is initially directed along the axis from a suitable source 20 at a power level of approximately 14 kilowatts substantially inwardly of the liner.

More particularly, the apparatus 10 of the present invention includes a stationary base plate 22 having a pair of outwardly facing C-shaped channels 24 mounted thereon in spaced substantially parallel relation to each other and to the axis 14 of the cylinder liner 12. Also secured to the base plate are a toothed rack 26 and a mirror mounting arrangement 28. The mirror mounting arrangement includes a vertical support leg 30 and a horizontally disposed arm integrally secured thereto, with suitable internal inlet and outlet passages therethrough (not shown) which permit a cooling fluid to be continually circulated through a mirror structure 34 secured to the end of the arm. With such an arrangement the mirror structure is aligned with the axis 14 so that an external cylindrical surface 36 thereof is substantially concentric to the axis, and a flat reflecting mirrored surface or mirror 38 thereon is disposed in a downwardly facing angled inclination of approximately 45° to the axis.

The apparatus 10 of the present invention further incorporates an axially movable table 40 which includes a pair of depending and substantially parallel frame members 42. A plurality of longitudinally spaced rollers, only one of which is visible and indicated by the reference numeral 44, are individually carried on the frame members for rotary movement along the C-shaped channels 24. In turn, cylinder liner 12 is rotatably supported on the table by a pair of elongated cylindrical rollers 46 and 48 which rotate on a pair of support pins 50. These support pins are also disposed in parallel relation with respect to the axis 14 by a frame 52 secured to the table.

A drive mechanism generally indicated by the reference numeral 54 simultaneously rotates the cylinder liner 12 and moves it along the axis 14 as hereinbefore stated. This drive mechanism includes a drive motor 56 with an output pulley 58 at one extremity thereof which is connectable by an endless belt 60 to the cylindrical roller 46. A drive motor 62, also forming a portion of the drive mechanism, has an output gear 64 thereon which is disposed in intermeshed toothed engagement with the fixed rack 26. With rotation of the output gear 64 the support table 40 is axially moved along the channels 24 at a preferred rate of approximately 4 or 5 inches per minute.

With substantially simultaneous rotation and axial movement of the liner 12 relative to the stationary mirror 38, the laser beam 18 is reflected from the mirror substantially transversely of the axis 14 upon the cylindrical bore 16 providing a predetermined relatively localized heating zone 66 on an internal surface 68 thereof. In effect, the heating zone travels a substantially helical path on the internal surface of the bore in progressively scannably heat treating relation. In the instant example the laser beam has a substantially annular cross sectionally shaped beam focal pattern at the heating zone. Specifically, the beam focal pattern is doughnut shaped with a 1.25 inch O.D. and 0.80 inch I.D., which results in a proportionately calculated power density level of approximately 19.3 kilowatts per square inch at the heating zone. With the relative helical movement thereof taken into account, surface heating of the bore is accomplished at a rate of approximately 25 kw-sec/in². Preferably, in order to reduce surface contamination of the mirror and to remove smoke a jet of a suitable gas is directed from a nozzle 69 generally across the mirror and through the liner.

OPERATION

While the operation of the present invention is believed clearly apparent from the foregoing description, further amplification will subsequently be made in the following brief summary of such operation. With substantially simultaneous operation of the drive mechanism 54 including both drive motors 56 and 62, and the laser beam source 20, the cylinder liner 12 is rotated and moved along the axis 14 as shown by directional arrows A and B respectively. Since the laser beam 18 is focusably directed substantially along the axis 14 thereof, and the 45° mirror 38 is stationary, the beam is reflected substantially radially outwardly onto the surface 68 so that the relatively hot, predetermined localized heating zone 66 effectively follows a substantially helical path thereon.

Figure 2:
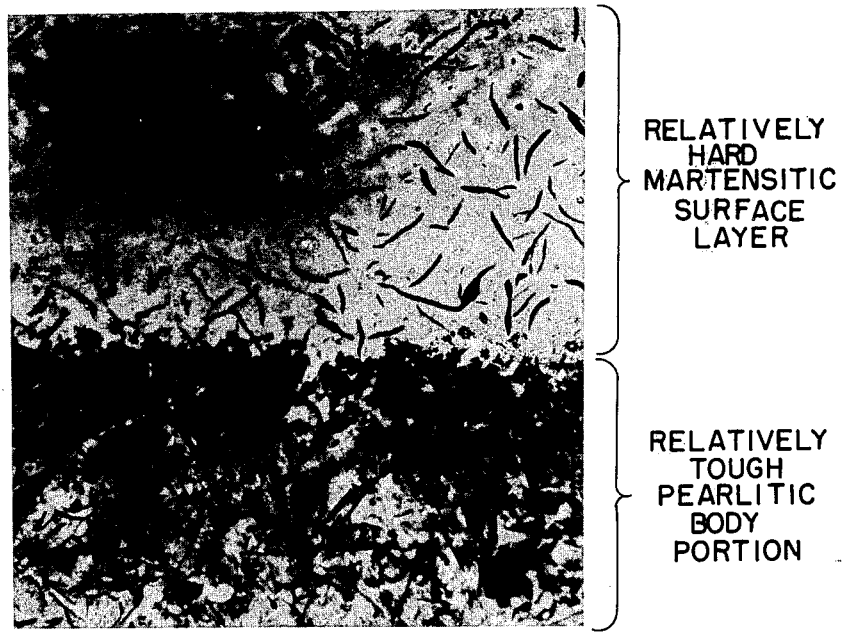
FIG. 2 is a photomicrograph of a polished and etched section of a gray iron engine cylinder liner showing a heat treated, hardened wear surface thereon at a magnification of approximately 100 times its true size as attained by the apparatus of FIG. 1 and utilizing the method of the present invention.

The effectiveness of the method and apparatus of the present invention is shown by the photomicrograph of FIG. 2, which discloses the microstructure of the surface hardened gray iron cylinder liner 12. The upper portion of the photomicrograph shows the surface layer hardened to a predetermined depth of approximately 0.020 inch to 0.030 inch, while the lower portion shows the tougher body portion of the liner including the relatively normal and unaffected distribution of graphite and carbide particles on a pearlite background. Thus, the method and apparatus of the present invention is effective to provide a relatively hard martensitic surface layer on a relatively tougher pearlitic body portion, and the lighter color of the hardened surface layer clearly illustrates the demarcation therebetween.

DESCRIPTION OF ALTERNATE EMBODIMENT

With reference to FIG. 3, an alternate embodiment apparatus 70 of the present invention effectively produces a localized heating zone 72 having a more refined power density distribution of the laser beam 18 for hardening the internal surface of the difficult to heat treat, cast iron cylinder liner 12. The apparatus 70 includes the laser beam, the rotatable and axially movable cylinder liner, and the inclined mirror 38 disposed therein which are essentially identical to similarly numbered corresponding elements described above with respect to the basic embodiment. However, the alternate and more advanced apparatus provides a mirror system 74 effective to both shape and oscillate the laser beam or improved heating contact with the internal surface 68 of the cylindrical bore 16.

The mirror system 74 includes a first mirror structure 76 having a relatively long focal point, and a substantially vertically disposed arcuately concave reflecting surface 78 thereon. This reflecting surface is disposed along an axis 80 of the initially collimated laser beam at a slightly inclined angle thereto so as to direct the beam convergingly in width only to impinge on a second mirror structure 82. The second mirror structure has a flat, substantially vertically oriented, but oscillatable reflective surface 84 thereon that directs the beam back to a third mirror structure 86 having a substantially upright, flat reflecting surface 88 thereon. From the reflecting surface 88 the beam continues to converge and to be dimensionally reduced in width from the originating collimated cross sectional beam pattern represented by FIG. 4 to the pattern represented by FIG. 5. Note that the pattern height (H) is substantially unchanged, while the width (W) has decreased from $W_1$ to $W_2$. This continuing convergence is, however, interrupted or modified by the fourth mirror structure 90 wherein a substantially horizontally oriented arcuately concave reflecting surface 92 thereon effectively converges the beam at a substantially right angle to the original direction of convergence to also reduce the height of the beam. At this stage the beam is directed substantially along the longitudinal axis 14 of the liner 12 inwardly thereof, and reflected from the mirror 38 transversely directly upon the internal surface 68 of the liner.

More particularly, the alternate embodiment apparatus 70 of the present invention provides a laser beam section as shown in FIG. 6 at the localized heating zone 72 made up of an elongated focal pattern 94 having a height ($H_2$) which has been reduced only a relatively limited degree from the original beam height ($H_1$), and a width ($W_3$) which has been considerably reduced from the original beam width ($W_1$). This elongated focal pattern is relatively rapidly oscillated normal to its height a distance (D) of twice its oscillating amplitude as schematically illustrated. This elongated focal pattern, for example, having a height of 1 inch and a width of 0.1 inch, is oscillated at a frequency of 125 cycles per second by limited angular rotation of the second mirror structure 82 about a vertical axis 96. Such refined focal pattern has a substantially more uniform energy distribution when compared to a conventional annular shaped laser beam focal pattern which inherently normally has uneven energy distribution.

With the alternate apparatus 7 of the present invention the parameters of the elongated focal pattern 94 can be easily modified by increasing or decreasing the radius of curvature of the reflective surfaces 78 and 92, which respectively decreases or increases the rate of convergence of the laser beam in transversely disposed planes, or by adjusting the distances between and the positions of the mirror structures 76, 82, 86, and 90, or a combination of both. In regard to the generation of the subject elongated focal pattern and the oscillation thereof cross reference is herein made to U.S. Pat. No. 3,957,339 issued May 18, 1976 to S. L. Engel, and assigned to the assignee of the present invention, now U.S. Pat. No. 3,957,339.

Further, as shown in FIG. 7 the laser beam pattern at the localized heating zone 72 due to rapidly oscillating the elongated focal pattern 94 transversely thereto is substantially rectangular as is schematically indicated at 98. But since the cylinder liner 12 is rotating and moving linearly axially with respect to the pattern 98, the alternate apparatus of the present invention also effectively progressively helically scannably heat treats the internal surface 68 thereof as indicated by the schematic shading in FIG. 7. It has been found that such refined apparatus can heat treat the cast iron cylinder liner to a greater depth without melting the internal surface thereof due to the relatively more uniform energy distribution of the patterns possible therewith.

DESCRIPTION OF SECOND ALTERNATE EMBODIMENT

FIG. 8 of the drawings shows a second alternate embodiment apparatus 100 comparable to the above described embodiments, only adaptable to heat treating a cylinder bore 102 of a relatively heavy engine block 104 which remains stationary since it is not as conveniently rotatable as is the previously described engine cylinder liner 12. The mirror structure 34 of this embodiment is disposed on a shaft 106 rotatable by a gear train 108 and a drive motor 110. The shaft is supported by a housing 112 provided with an integrally toothed rack 114, so that rotation of a drive gear 116 associated with a drive motor 118 causes axial movement of both the housing and the shaft with respect to the cylinder bore. A fluid inlet passage 120 and a fluid outlet passage 122 in the housing communicate with corresponding fluid circulating passages 124 and 126 in the shaft and mirror structure as shown for the purpose of cooling the mirror structure and thereby dissipating the heat of the impinging laser beam 18 therefrom. With simultaneous operation of the drive motors 110 and 118, the inclined mirrored surface 38 is rotated and moved axially within the engine block 104 to transversely direct the laser beam on the internal surface of the bore to progressively scannably heat treat it in a helical manner as hereinbefore stated.

DESCRIPTION OF THIRD ALTERNATE EMBODIMENT

With reference to FIG. 9 of the drawings a third alternate embodiment apparatus 128 of the present invention includes an axially positionable, rotating mirror structure 130 disposed on the longitudinal axis 14 of the cylinder liner 12. This mirror structure includes a conically shaped mirrored surface 132 thereon having an apex 134 disposed on the axis. A conically converging laser beam 136 having a doughnut shaped cross section is directed onto the mirrored surface 132 and is reflected thereby substantially radially outwardly onto the internal surface 68 of the liner to provide a generally circumferentially disposed heating zone or ring-shaped focal pattern 138 thereon. It should be appreciated that such ring-shaped focal pattern can be used to provide an axially narrow hardened wear surface on the liner, in which case it is not necessary to axially move the mirror structure relative to the liner as hereinbefore described.

DESCRIPTION OF FOURTH ALTERNATE EMBODIMENT

A fourth alternate embodiment apparatus 140 of the present invention is shown in FIG. 10 wherein the apparatus is aligned generally on the longitudinal axis 14 of the engine block 104 outwardly of the cylindrical bore 16. This apparatus includes a rotating housing 142 having a window or narrow slit 144 therein opening toward the bore, and a longitudinally opposite throat 146 opening into a stationary housing 148 permitting passage of the laser beam 18 therethrough. A drive gear support and bearing arrangement 150 is associated between the housings, so that the housing 142 and a mirror system 152 suitably protectingly supported therein may be rotated relative to the cylinder bore.

More particularly, the internal mirror system 152 of the apparatus 140 includes first, second and third mirrors 154, 156 and 158 which reflectably direct, focus and oscillate the incoming cross sectionally, doughnut shaped laser beam 18. The first mirror 154 and the second mirror 156 are arcuately concave and arranged at substantially right angles to each other in a manner similar to the mirror structures 76 and 92 of the first alternate embodiment apparatus 70 of FIG. 3. Thus, the laser beam pattern is modified as substantially hereinbefore described to the shape of the elongated focal pattern 94 as schematically illustrated after reflecting from the third mirror 158, which is flat. Relatively rapid oscillation of the third mirror moves the elongated focal pattern at right angles thereto on the surface of the bore 16 in substantially the same way as described with respect to FIG. 6. In addition, however, the third mirror is movably mounted within the rotating housing 142 so that the beam may be directed further axially inwardly within the cylinder bore. In this manner, simultaneous rearranging of the orientation of the third mirror with respect to the other two mirrors effects axial displacement of the localized heating zone 72 on the surface of the bore, which when taken in conjunction with rotation of the housing 142 results in its helically spannable heat treatment.

Thus, the improved method and apparatus of the present invention is adapted to efficiently and rapidly heat treat a relatively, inaccessible surface within a workpiece using a beam of electromagnetic energy such as a laser beam. It teaches a method and apparatus for progressively scanning an engine cylinder bore, for example, with a relatively instantaneous localized heating zone resulting from the heat of the laser beam so that the bore may be surface hardened with a minimum of heat transmission to the entire workpiece. Further, the present invention is easily adaptable to heat treat particular areas of a bore to relatively closely dimensioned regions and to specific depths of surface hardness to a degree not heretofore accomplished. Still further, alternate embodiments are shown and described to progressively scannably heat treat an easily positioned engine cylinder liner on the one hand, or an immobile engine block on the other, using one or more reflecting mirrors and associated drive mechanisms for effecting relative movement between the workpiece and mirrors.

While the invention has been described and shown with particular reference to the basic and alternate embodiments, it will be apparent that other variations might be possible that would fall within the scope of the present invention, which is not intended to be limited except as defined in the following claims.

What is claimed is:

1. A method of heat treating a bore in a workpiece to increase its surface hardness comprising;
    shaping an annular laser beam emanating from a source into an elongated focal pattern to provide a more evenly distributed energy level in cross section;
    directing said elongated focal pattern generally axially inwardly toward such bore;
    reflecting said elongated focal pattern from mirror means substantially transversely upon a surface of said bore to provide an instantaneously more uniformly hot heating zone thereat; and
    effecting relative motion between the workpiece and said mirror means so that said bore is progressively scannably heat treated to minimize heating of the entire workpiece.

2. The method of claim 1 including the step of simultaneously axially displacing and rotating the workpiece relative to said laser beam so that said localized heating zone follows a substantially helical path on the surface of said cylindrical bore.

3. The method of claim 1 including the step of rapidly oscillating said elongated focal pattern normal thereto to form said laser beam into a rectangular pattern in cross section.

4. A method of heat treating the bore in a ferrous cylinder liner to increase the metallurgical hardness of its surface to a predetermined depth, comprising;
    shaping an annular laser beam from a suitable source into an elongated focal pattern;
    oscillating said elongated focal pattern to provide a rectangular pattern in cross section with a more evenly distributed energy level;
    directing said rectangular pattern generally axially inwardly of such bore;
    reflecting said rectangular pattern from a mirror substantially transversely directly upon the surface of said bore to provide a relatively uniform heating zone thereat; and
    effecting relative motion between the ferrous cylinder liner and said mirror so that said bore is progressively spannably heat treated while minimizing heat transfer to the entire cylinder liner.

5. A method of heat treating a cylindrical bore in a metallic workpiece to provide a hard uniform surface layer on a tough body portion without melting the internal surface of the bore comprising;
    directing a laser beam generally axially inwardly toward such bore with said laser beam having a relatively instantaneously generated elongated focal pattern in cross section;
    reflecting said laser beam from a mirror onto a surface of said bore;
    rapidly oscillating said laser beam transversely of said elongated focal pattern to effect a rectangular heating pattern on the surface of said bore having a more uniform and improved energy distribution thereat; and
    effecting relative motion between such workpiece and said mirror so that said bore is progressively scannably heat treated to minimize heating of the entire workpiece.

6. A method of heat treating a cylinder bore in an engine block to increase its surface hardness comprising;
    shaping an annular laser beam into an elongated focal pattern;
    oscillating said elongated focal pattern to provide a rectangular pattern in cross section with a more evenly distributed energy level;
    directing said rectangular pattern generally axially inwardly toward such cylinder bore;
    reflecting said laser beam pattern from mirror means upon a surface of said cylinder bore to provide a uniformly hot heating zone thereat; and
    simultaneously rotating and positioning said mirror means for scannably aiming said laser beam pattern and effecting continuous traveling of said heating zone along an annular path on the surface of said cylinder bore for progressive heat treatment thereof.

7. The method of claim 6 wherein said engine block is stationary and said step of simultaneously rotating and positioning said mirror means includes progressively axially displacing said mirror means to effect traveling of said heating zone along a helical path.

* * * * *